United States Patent
Isayama et al.

(10) Patent No.: US 7,559,679 B2
(45) Date of Patent: Jul. 14, 2009

(54) VEHICLE LIGHT APPARATUS AND MOTORCYCLE HAVING THE LIGHT APPARATUS

(75) Inventors: Hiroyuki Isayama, Samutprakam (TH); Niran Thuptimkuna, Samulprakarn (TH)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 43 days.

(21) Appl. No.: 11/459,576

(22) Filed: Jul. 24, 2006

(65) Prior Publication Data

US 2007/0025113 A1 Feb. 1, 2007

(30) Foreign Application Priority Data

Jul. 25, 2005 (JP) ............................. 2005-213970

(51) Int. Cl.
*F21V 5/00* (2006.01)
*B60Q 1/56* (2006.01)
*B62J 6/00* (2006.01)
*F21V 33/00* (2006.01)

(52) U.S. Cl. ...................... 362/522; 362/473; 362/497; 362/520

(58) Field of Classification Search ................ 362/473, 362/497, 506, 522, 540–542, 520, 521, 546, 362/548, 549, 326–329, 332; D26/28, 35, D26/36, 120, 122

See application file for complete search history.

(56) References Cited

U.S. PATENT DOCUMENTS

| | | | | |
|---|---|---|---|---|
| 1,604,213 A | * | 10/1926 | Zorger | 362/309 |
| 1,740,588 A | * | 12/1929 | Hamilton | 362/516 |
| 2,088,501 A | * | 7/1937 | Arbuckle | 362/544 |
| 2,798,147 A | * | 7/1957 | Orsatti | 359/528 |
| 4,530,041 A | * | 7/1985 | Yamai et al. | 362/268 |
| 4,556,928 A | * | 12/1985 | Tysoe | 362/510 |
| 4,586,116 A | * | 4/1986 | Kasboske | 362/293 |
| 4,811,174 A | * | 3/1989 | Kanzler et al. | 362/538 |
| 4,845,599 A | * | 7/1989 | Lievin | 362/473 |
| 5,580,165 A | * | 12/1996 | Natsume et al. | 362/521 |
| 5,707,130 A | * | 1/1998 | Zwick et al. | 362/517 |
| 6,019,492 A | * | 2/2000 | Ikegaya et al. | 362/521 |
| 6,382,822 B1 | * | 5/2002 | Maekawa et al. | 362/522 |

FOREIGN PATENT DOCUMENTS

JP 62-153709 9/1987
JP 2517216 4/1996

* cited by examiner

*Primary Examiner*—Ismael Negron
*Assistant Examiner*—David R Crowe
(74) *Attorney, Agent, or Firm*—Hogan & Hartson LLP

(57) ABSTRACT

A vehicle light apparatus has a lamp bulb that is not visible from the outside and a reflecting area that is not conspicuous when the light is on. An inner lens reflects light, from the lamp bulb toward a lens opening and an outer lens attached to the lens opening covers the lamp bulb. A reflecting area having a lower light transmission rate than the outer lens is provided on the tail lens where it opposes the lamp bulb. Light transmission areas having a higher light transmission rate than the reflecting area are provided on the reflecting area.

20 Claims, 7 Drawing Sheets

VEHICLE LIGHT APPARATUS AND MOTORCYCLE HAVING THE LIGHT APPARATUS

RELATED APPLICATIONS

This application claims the benefit of priority under 35 USC 119 of Japanese patent application no. 2005-213970, filed on Jul. 25, 2005, which application is hereby incorporated by reference in its entirety.

BACKGROUND OF THE INVENTION

1. Field of the Invention The present invention relates to a vehicle light apparatus and a motorcycle provided with the light apparatus as its taillight.

2. Description of Related Art

A light apparatus used in an automobile, motorcycle, and others, has a lamp bulb, an inner lens for reflecting light from the lamp bulb toward a lens opening, and an outer lens attached to the lens opening to cover the lamp bulb.

Sometimes, in this type of light apparatus, a reflecting area for preventing transmission of light from the lamp bulb to the outside is provided in the center of the outer lens, in order to improve external appearance by making the lamp bulb invisible from the outside. (See JP-U Sho 62-153709, for instance.)

The structure described above, in which the reflecting area is provided in the center of the outer lens, has a problem in that the amount of light radiated to the outside is reduced when the light is on, although the external appearance may be improved because the lamp bulb is hidden and invisible from the outside. It also has a problem that in the reflecting area is conspicuous when the light is on, thereby impairing the external appearance is.

SUMMARY OF THE INVENTION

The present invention addresses and overcomes these issues by providing a vehicle light apparatus wherein the lamp bulb is not visible from the outside, the amount of radiating light is not reduced, and the reflecting area is not conspicuous when the light is on.

The present invention is characterized that the vehicle light apparatus having: a lamp bulb; an inner lens for reflecting the light from the lamp bulb toward a lens opening; and an outer lens attached to the lens opening so as to cover the lamp bulb, in which a reflecting area having lower light transmission rate than the outer lens is provided in the part opposite to the lamp bulb, and light transmission areas having higher light transmission rate than the reflecting area are provided on the reflecting area.

In the vehicle light apparatus according to the present invention, the reflecting area having lower light transmission rate is provided in the part opposite to the lamp bulb, and light transmission areas having higher transmission rate than the reflecting area are provided on the reflecting area. Thus, the lamp bulb is hidden by the reflecting area to be invisible from the outside, and at the same time, the light from the lamp bulb is radiated to the outside through the light transmission areas. This results in the ability to prevent the reduction of the amount of radiating light due to the provision of the reflecting area when the light is on, as well as the ability to restrain the reflecting area from being conspicuous, which improves the external appearance.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
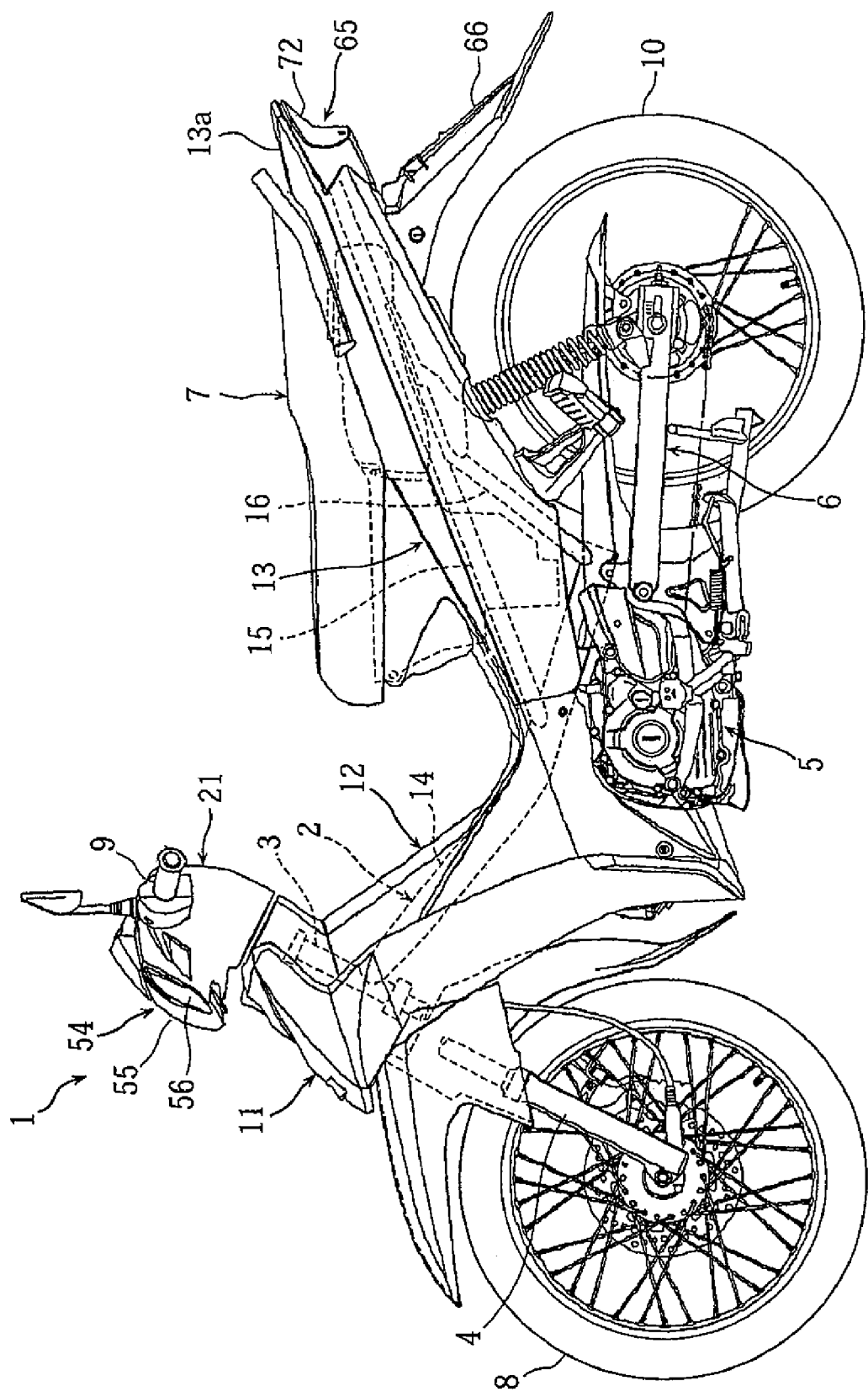
FIG. 1 is a side view of a motorcycle provided with a taillight apparatus according to an embodiment of the present invention.
Figure 2:
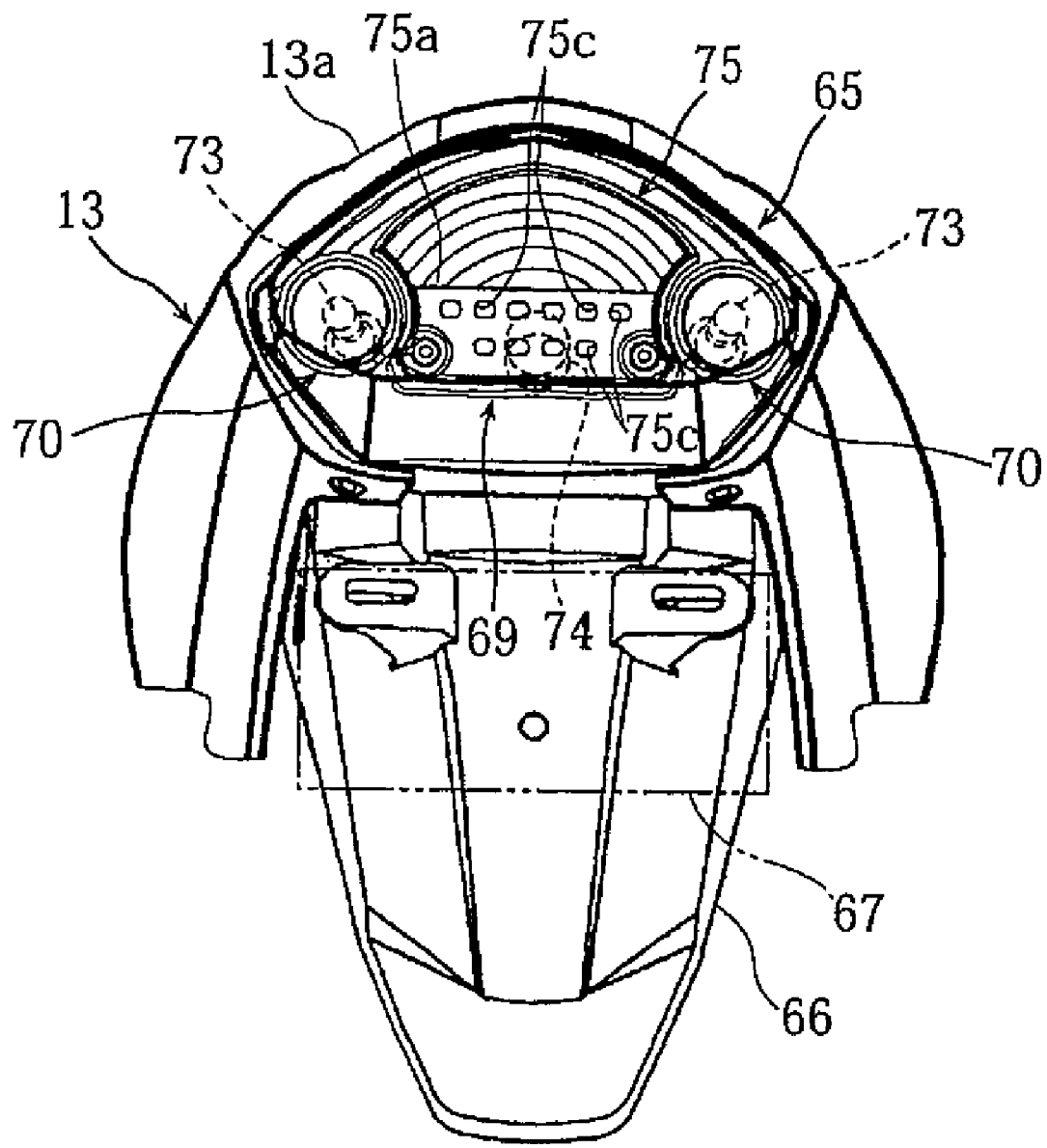
FIG. 2 is a rear view of the taillight apparatus.
Figure 3:
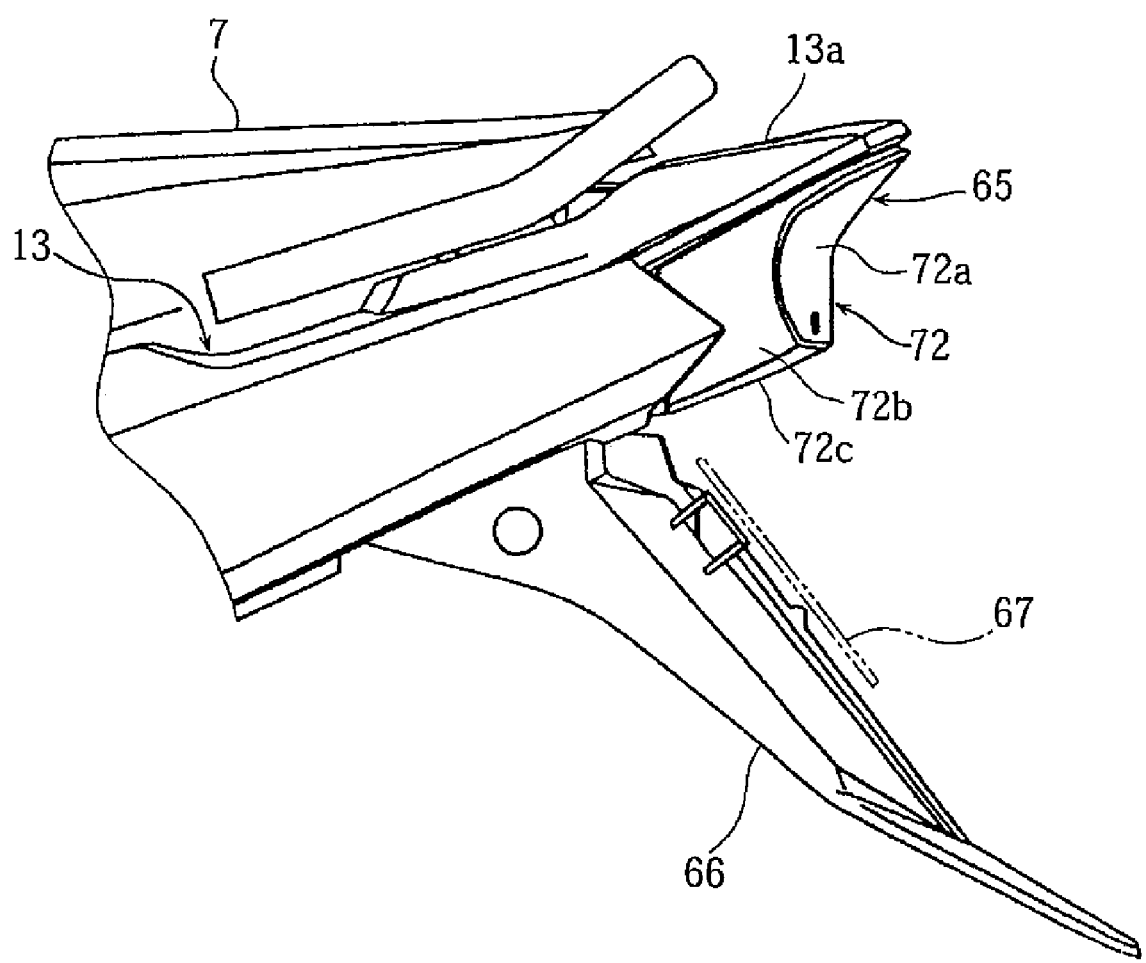
FIG. 3 is a side view of the taillight apparatus.

An embodiment of the present invention is described below with reference to the attached drawings.

FIGS. 1-7 are illustrations for describing a motorcycle with a taillight device according to an embodiment of the present invention. In the following description and claims, the terms "right," "left," "front" and "rear" mean right, left, front and rear sides from the perspective of a rider on the seat.

In the drawings., reference numeral 1 refers to a motorcycle. The motorcycle 1 has: an underbone type body frame 2; a front fork 4 pivotally supported so that it can be steered to both sides by a head pipe 3 firmly fixed to the front end of the body frame 2; an engine unit 5 suspended from and supported by the center of the body frame ; a rear arm 6 pivotally supported in a vertically swingable manner by the center of the body frame 2; and a seat 7 mounted at the upper rear part of the body frame 2 for accommodating two persons.

A front wheel 8 is rotatably supported by the lower end of the front fork 4, and a steering handlebar 9 is secured to the upper end of the front fork 4. In addition, a rear wheel 10 is rotatably supported by the rear end of the rear arm 6.

The body frame 2 has: a single main frame 14 extending obliquely downward from the head pipe 3 toward the rear of the vehicle body in a generally straight line; a pair of left and right seat rails 15, 15 joined to the rear part of the main frame 14 and extending obliquely upward toward the rear of the vehicle body in a generally straight line; and a pair of left and right back stays 16, 16 joined to bridge the position around the longitudinal center of the left and right seat rails 15, 15 and the rear end of the main frame 14.

The head pipe 3 of the body frame 2 is masked by a front cover 11 at its front side, and is masked by a leg shield 12 at its rear side. Also, part of the body frame 2 below the periphery of the seat 7 is masked by a side cover 13.

Further, the steering handlebar 9 is surrounded by a handlebar cover 21, and the front wall part of the handlebar cover 21 is equipped with a head light apparatus 54 integrally composed of a head light 55 and flasher lamps 56 provided on the left and the right side, respectively, of head light 55.

A rear fender 66 for masking the upper part of rear wheel 10 is disposed on the lower face of the side cover 13 at its rear end. A license plate 67 is attached to the back of the rear fender 66.

A taillight apparatus 65 is disposed at the rear ends of the left and right seat rails 15. The periphery of the taillight apparatus 65 is surrounded by the rear end 13a of the side cover 13 without any gap. The license plate 67 is disposed below the taillight apparatus 65.

The taillight apparatus 65 includes a taillight 69 disposed in the transversal center of the motorcycle within the common housing 71 having a lens opening 71a that opens to the rear, a pair of left and right flasher lamps 70, 70 disposed at the left and the right side of the taillight 69 respectively, and a common clear lens (outer lens) 72 installed on the lens opening 71a of the housing 71.

When viewed from the rear of the vehicle, the left and the right flasher lamps 70 have a generally circular shape, while the taillight 69 has a generally straight, lower edge, a circular arc upper edge, and a left and a right edge forming a concave along the inner periphery of the flasher lamps 70.

The clear lens 72 is made of transparent synthetic resin, having a rear face part 72a masking the housing 71 from the rear; left and right side face parts 72b, 72b extending from the left and the right edges of the rear face part 72a respectively toward the front part; and a bottom face part 72c extending from the lower edge of the rear face part 72a toward the front part. The left and the right side face parts 72b, and the bottom face part 72c are exposed outwardly from the rear end 13a of the side cover 13.

The left and the right flasher lamps 70 are composed of left and right inner lens parts 71b, 71b, each having a generally hemispherical shape formed on the housing 71 and an opening toward the left rear or the right rear, and lamp bulbs 73, 73 installed detachably at each bottom of the inner lens parts 71b.

Each of the left and the right inner lens parts 71b is made by covering its inner surface with a reflector (not shown) to make the light from the lamp bulb 73 reflect and radiate outwardly through the clear lens 72.

The tail lamp 69 is composed of a center inner lens part 71c having a generally hemispherical shape formed on the housing 71 and an opening toward the rear, a lamp bulb 74 installed detachably at the bottom of the inner lens part 71c, and a tail lens 75 attached to the lens opening 71d of the inner lens 71c so as to cover the lamp valve 74.

The tail lens 75 is made by red colored synthetic resin that allows light transmission. The clear lens 72 covers the tail lens 75 from the rear. In addition, the lower left and the lower right ends of the tail lens 75, together with the clear lens 72, are fastened to the housing 71 by screws 76.

The center inner lens part 71c is fabricated by covering its inner surface with a reflector (not shown) to make the light from the lamp bulb 74 reflect and radiate outwardly through the tail lens 75 and the clear lens 72.

Figure 6:
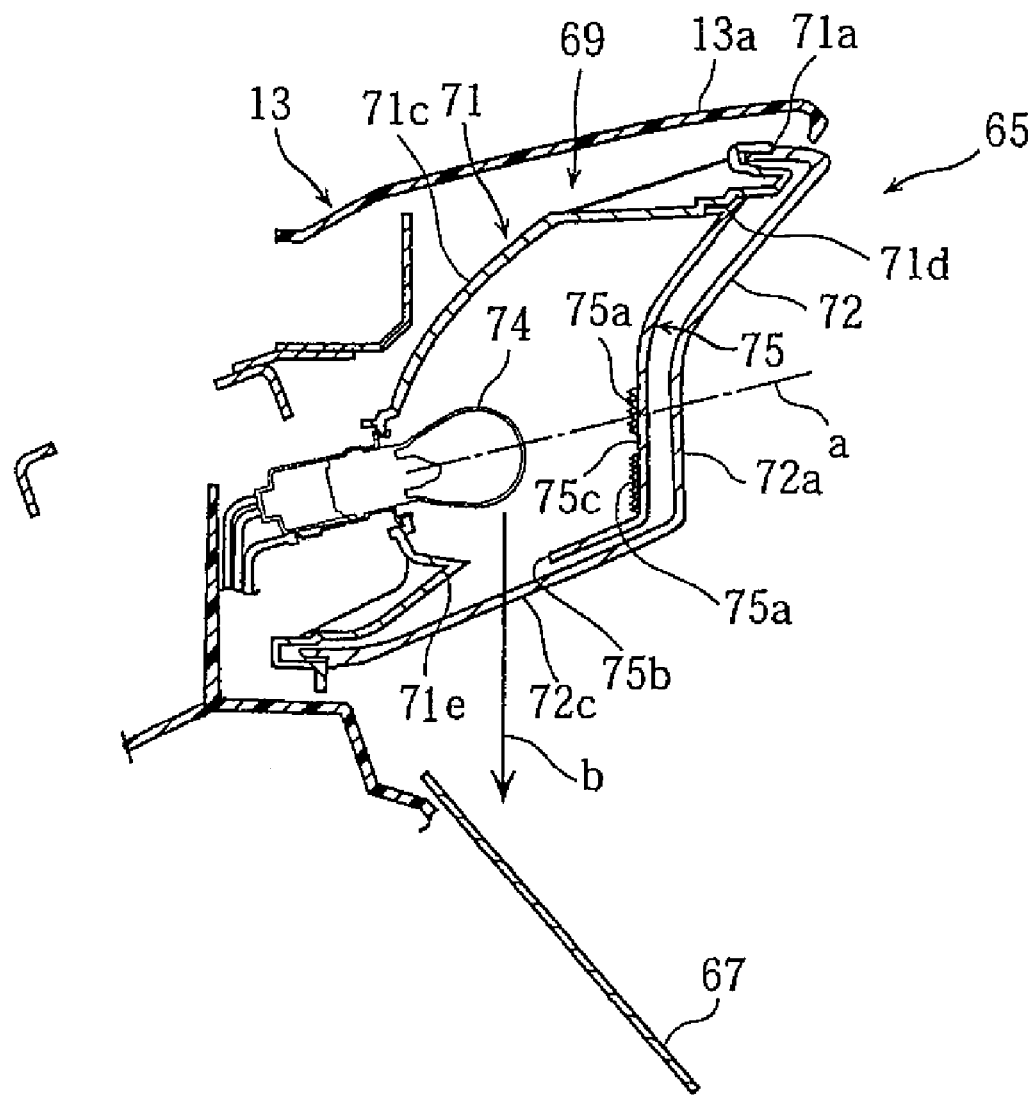
FIG. 6 is a sectional side view of the taillight apparatus taken along line VI-VI in FIG. 4.
Figure 7:
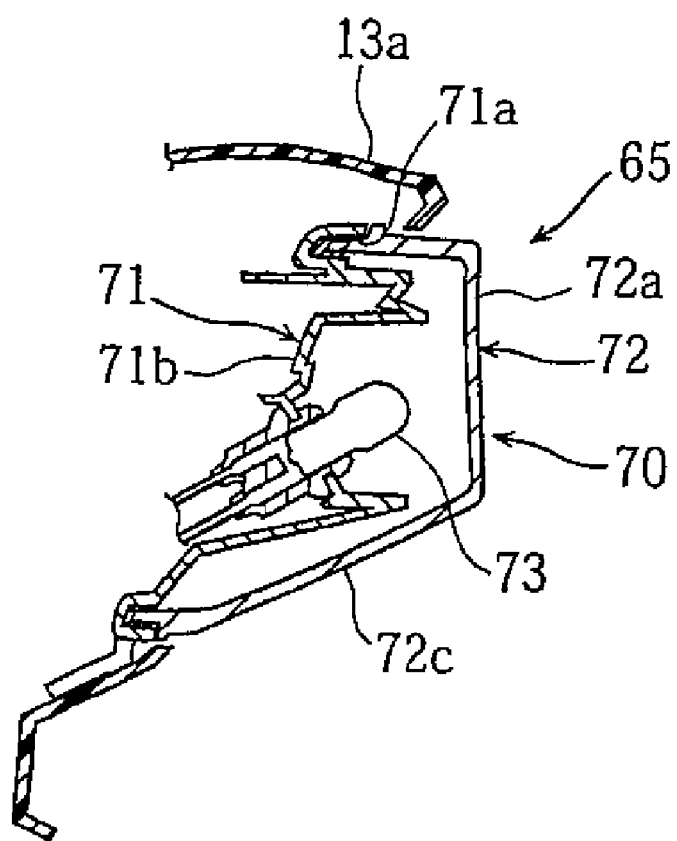
FIG. 7 is a sectional side view of the taillight apparatus taken along line VII-VII in FIG. 4.

A light radiating part 75b is formed at the bottom (in the lower part) of the tail lens 75 (FIG. 6). The light radiation part 75b is formed by cutting out the tail lens 75 where it faces the license plate 67. In this way, the light from the lamp bulb 74 is emitted directly onto the license plate 67 via the light radiation part 75b (see the arrow (b) in FIG. 6). Here, the bottom part 71e of the center inner lens 71c is bent to the front at a position where the bottom part 71e does not cover the area below the lamp bulb 74, thus preventing the interception of light emitted by the lamp bulb 74.

A reflecting area 75a, having lower light-transmission rate than other areas by forming multiple concaves and convexes, is integrally formed on part of the inner face of the tail lens 75 opposing to the lamp bulb 74. The reflecting area 75a is formed to cover generally the lower half of the tail lens 75 in full length in the vehicle's transversal direction.

The reflecting area 75a has lower light-transmission rate than the clear lens 72 and the upper half of the tail lens 75. Thus, when viewed from the rear of the vehicle, the lamp bulb 74 is hidden by the presence of the reflecting area 75a. It should be noted that the light transmission rate of the reflecting area 75a is set at the level that the lamp bulb 74 is not visible through the reflecting area 75a from the rear of the vehicle, even when the lamp bulb 74 is turned on.

In addition, the lamp bulb 74 is disposed slantingly upward so that its optical axis (a) is oriented to the upper edge of the reflecting area 75a. This arrangement can make most of the light from the lamp bulb 74 radiated toward the upper half of the tail lens 75.

Further, multiple light transmission areas 75c having higher light transmission rate compared with the reflecting area 75a are formed within the reflecting area 75a. Each of the light transmission areas 75c is aligned in vehicle's transverse direction so that they are apart from each other by a given distance, and is arranged in vertically separated two lines. The light transmission areas 75c are formed by removing the concaves and convexes on the reflecting area 75a, or by not making the concaves or convexes when the reflecting area 75a is formed. In this way, the light from the lamp bulb 74 is partly transmitted through the individual light transmission areas 75c, and radiated outward by way of the clear lens 72.

According to this embodiment, the reflecting area 75a having lower light-transmission rate is formed on the inner face of the tail lens 75 opposing to the lamp bulb 74, and the light transmission areas 75c having higher light transmission rate than the reflecting area 75a are formed within the reflecting area 75a. Thus, the lamp bulb 74 is invisible from the outside as it is hidden by the reflecting area 75a, avoiding the impairment of external appearance caused by the visible lamp bulb 74. At the same time, the light from the lamp bulb 74 is radiated outward as it is transmitted through the red colored tail lens 75. Namely, when viewed from the rear of the motorcycle, the light transmission areas 75c and the tail lens 75 above the reflecting area 75a glare red, preventing the reduction of the radiating light amount due to the provision of the reflecting area 75a when the light is on or when the brake is activated, and at the same time, making the reflecting area 75a less conspicuous when the light is on, to improve the external appearance.

Further, the reflecting area 75a is constructed by integrally forming multiple concaves and convexes on the tail lens 75, while the light transmission areas 75c are constructed by not forming such concaves and convexes. This allows both the reflecting area 75a and the light transmission areas 75c to be formed simultaneously for fabricating the tail lens 75 by injection molding, which restrains the cost increase compared with the case of combining separate parts into one.

Figure 4:
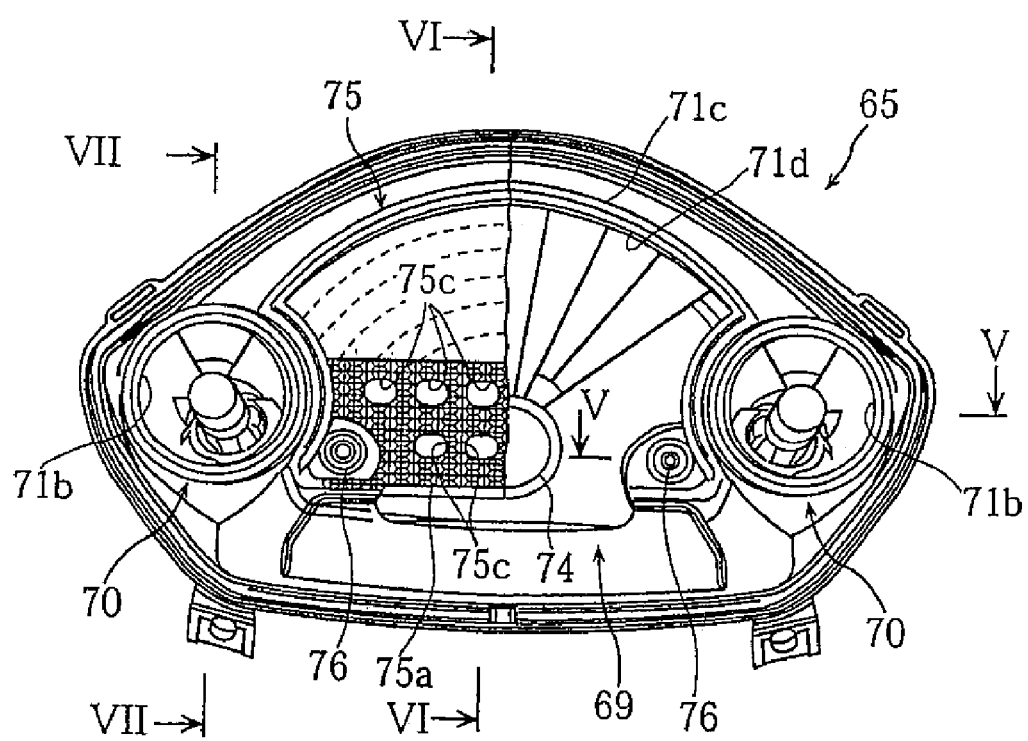
FIG. 4 is a rear view of the taillight apparatus.
Figure 5:
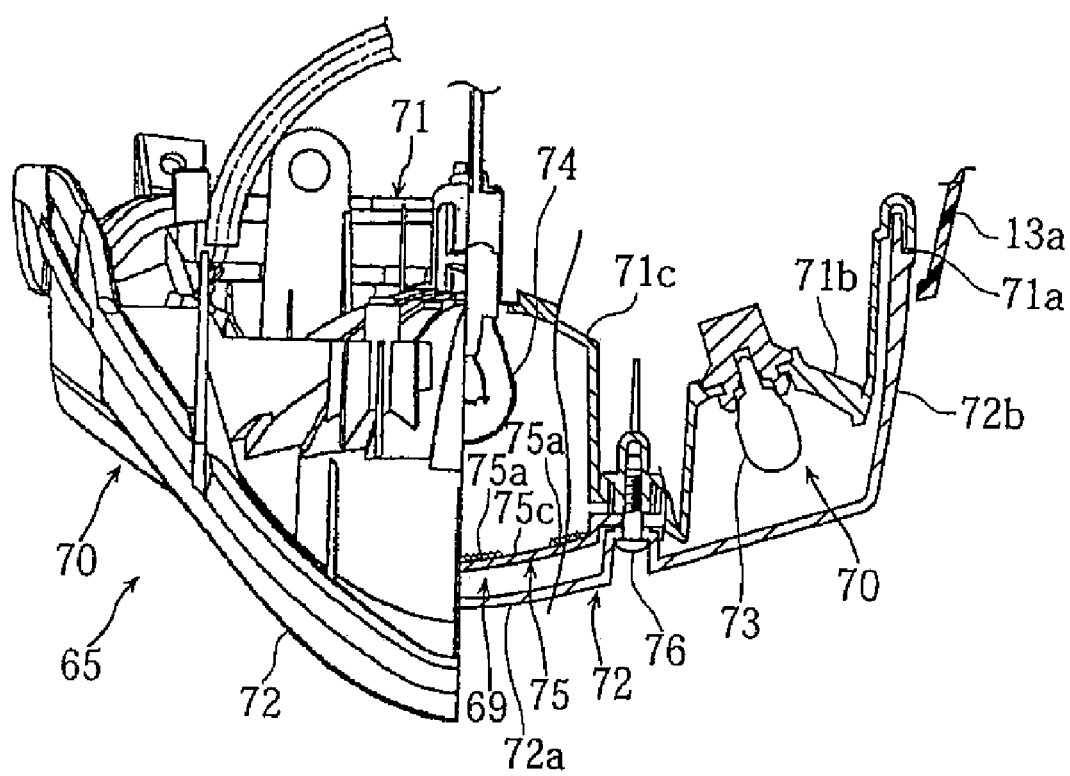
FIG. 5 is a sectional top plan view of the taillight apparatus taken along line V-V in FIG. 4.

According to the present embodiment, each of the light transmission areas 75c is aligned in vehicle's transverse direction so that they are apart from each other by a given distance, and is arranged in vertically separated two lines, making the light transmission areas 75c dispersed evenly all over the reflecting area 75a (FIG. 4). Thus, the reflecting area 75a becomes further inconspicuous when the light is on.

According to the present embodiment, the lamp bulb 74 is disposed slantingly upward so that its optical axis (a) is oriented to the upper edge of the reflecting area 75a, which allows most of the light from the lamp bulb 74 to be radiated toward the upper half of the tail lens 75 when the light is on or when the brake is activated, improving the visibility from the rear, which could otherwise be impaired due to the provision of the reflecting area 75a.

According to the present embodiment, the light radiating part 75b for emitting the light from the lamp bulb 74 directly onto the license plate 67 is formed at the bottom of the tail lens 75. Thus, the license plate 67 can be illuminated by the lamp bulb 74 functioning as a brake lamp.

In addition, since the light radiating part 75b is formed by cutting out the tail lens 75 where it faces the license plate 67, the function as a brake lamp is not impaired when it is viewed from the rear.

It should be noted that the tail lens 75 according to the present embodiment is disposed inside the clear lens (outer lens) 72, and the reflecting area 75a is formed on the tail lens 75, however, the reflecting area may be formed integrally on the clear lens 72. Also, the outer lens may be molded from the red-colored synthetic resin, eliminating the tail lens. Then, the reflecting area may be formed integrally on the outer lens.

According to this embodiment, the reflecting area is constructed by multiple concaves and convexes, while the light transmission areas are constructed by not forming such concaves and convexes. However, the reflecting area and the light transmission areas may be constructed using materials of different light transmission rates. Further, the light transmission areas may be provided by making holes on the reflecting area, or by forming them with another material of higher light transmission rate.

The invention has been described as applied to a motorcycle, however, the light apparatus of the present invention is also applicable to an automobile.

The particular embodiments of the invention described in this document should be considered illustrative, rather than restrictive. Modification to the described embodiments may be made without departing from the spirit of the invention as defined by the following claims.

The invention claimed is:

1. A vehicle light apparatus comprising:
    a lamp bulb having an optical axis;
    an inner reflector for reflecting light from the lamp bulb toward an opening in the inner reflector; and
    an outer lens attached to the opening in the inner reflector to cover the lamp bulb, wherein
    a reflecting area having a lower light transmission rate than the outer lens is provided in a part opposite to the lamp bulb, wherein the optical axis of the lamp bulb passes through the reflecting area,
    light transmission areas having a higher light transmission rate than the reflecting area are provided on the reflecting area, wherein the optical axis of the lamp bulb does not pass through the light transmission areas,
    a tail lens is disposed inside the outer lens, and the reflecting area and the light transmission areas are formed on the tail lens,
    at least a portion of the outer lens and a portion of the tail lens extend generally parallel to each other,
    upper halves of the portions of the outer lens and tail lens extend obliquely upward and away from the lamp bulb,
    lower halves of the portions of the outer lens and tail lens extend vertically, and only the lower half of the portion of the tail lens has the reflecting area,
    the inner reflector extends obliquely generally in a same direction as the upper halves to cover an upper portion of the lamp bulb,
    the upper halves allow indirect light beams reflected by the inner reflector to pass therethrough more than direct light beams from the lamp bulb, and
    the lower halves allow the direct light beams from the lamp bulb to pass therethrough more than the indirect beams reflected by the inner reflector.

2. The vehicle light apparatus according to claim 1, wherein the reflecting area comprises multiple concaves and convexes formed on a face opposite to the lamp bulb, and the light transmission areas comprise areas of the reflecting area where no concaves or convexes are formed.

3. The vehicle light apparatus according to claim 2, wherein the light transmission areas are aligned in a vehicle's transverse direction and spaced from each other by a given distance, and are arranged in two vertically separated lines.

4. The vehicle light apparatus according to claim 3, wherein the optical axis of the lamp bulb is oriented to the upper edge of the reflecting area.

5. A motorcycle comprising the light apparatus according to claim 1, wherein the light apparatus is provided at a rear end of the motorcycle as a taillight apparatus.

6. The motorcycle according to claim 5, wherein a light radiating part for emitting light from the lamp bulb directly onto a license plate is formed at a bottom of the tail lens.

7. The motorcycle according to claim 6, wherein the light radiating part is formed by cutting out the bottom of the tail lens.

8. The vehicle light apparatus according to claim 1, and further comprising a light radiating part for emitting light from the lamp bulb to an area beneath the light apparatus.

9. A taillight apparatus comprising:
    a lamp bulb having an optical axis;
    an inner reflector for reflecting light from the lamp bulb toward an opening in the reflector; and
    a lens covering the lamp bulb, the lens comprising
    a reflecting area of the lens in an area opposite the lamp bulb that has a lower light transmission rate than the lens, wherein the optical axis of the lamp bulb passes through the reflecting area, and
    light transmission areas within the reflecting area that have a higher light transmission rate than the surrounding reflecting area, wherein the optical axis of the lamp bulb does not pass through the light transmission areas, and wherein
    an upper half of the lens has a portion extending obliquely upward and away from the lamp bulb,
    a lower half of the lens has a portion extending vertically, and only the vertically extending portion of the lower half of the lens has the reflecting area,
    the inner reflector extends obliquely generally in the same direction as the upper half to cover an upper portion of the lamp bulb,
    the upper half allows an indirect light beam reflected by the inner reflector to pass therethrough more than a direct light beam from the lamp bulb, and
    the lower half allows the direct light beam from the lamp bulb to pass therethrough more than the indirect beam reflected by the inner reflector.

10. A taillight apparatus according to claim 9, wherein the reflecting area comprises multiple concaves and convexes and the light transmission areas do not comprise concaves and convexes.

11. A taillight apparatus according to claim 9, wherein the light transmission areas are aligned in two vertically spaced lines, and are horizontally spaced from each other a given distance.

12. A taillight apparatus according to claim 9, wherein the lens is a red colored tail lens, and the taillight apparatus further comprises a clear outer lens surrounding covering the tail lens.

13. A taillight apparatus according to claim 9, wherein the lens is a clear outer lens, and the taillight apparatus further comprises a red colored tail lens within the outer lens.

14. A taillight apparatus according to claim 9, wherein the lamp bulb is disposed slantingly upward such that its optical axis is oriented to the upper edge of the reflecting area.

15. A taillight apparatus according to claim 12, wherein an opening is formed at a bottom of the tail lens to allow light from the lamp bulb to radiate from the bottom of the tail lens.

16. A motorcycle comprising the taillight apparatus of claim 15 mounted at a rear end thereof.

17. The motorcycle according to claim 16, and further comprising a license plate mounting area positioned underneath the taillight apparatus to be illuminated by light projecting through the opening formed on the bottom of the tail lens.

18. A vehicle comprising the taillight apparatus of claim 9.

19. The vehicle light apparatus according to claim 1, wherein no intervening lens is present between the lamp bulb and the reflecting area.

20. The taillight apparatus according to claim 9, wherein no intervening lens is present between the lamp bulb and the reflecting area.

* * * * *